(12) United States Patent
Nelson

(10) Patent No.: US 6,644,819 B2
(45) Date of Patent: Nov. 11, 2003

(54) ILLUMINATED MIRRORED KALEIDOSCOPE AND ITS METHOD OF USE

(76) Inventor: Webb T. Nelson, 19180 144th Ave. NE., Woodinville, WA (US) 98072

( * ) Notice: Subject to any disclaimer, the term of this patent is extended or adjusted under 35 U.S.C. 154(b) by 0 days.

(21) Appl. No.: 10/094,433

(22) Filed: Mar. 11, 2002

(65) Prior Publication Data

US 2003/0169501 A1 Sep. 11, 2003

(51) Int. Cl.[7] .............................................. G02B 27/08
(52) U.S. Cl. ....................................................... 359/616
(58) Field of Search ................................. 359/616, 617

(56) References Cited

U.S. PATENT DOCUMENTS

| | | | | |
|---|---|---|---|---|
| 2,198,051 A | * | 4/1940 | Jordan ............................. 353/1 |
| 3,383,150 A | * | 5/1968 | Powers ......................... 359/617 |
| 3,748,013 A | * | 7/1973 | Orans .......................... 359/617 |
| 3,809,879 A | * | 5/1974 | Gonzalez ..................... 359/617 |
| 5,131,734 A | * | 7/1992 | Hausner ....................... 359/617 |
| 6,332,686 B1 | * | 12/2001 | Yoda ........................... 359/617 |
| 6,336,725 B1 | * | 1/2002 | Cianfichi, Jr. ............... 359/616 |

* cited by examiner

Primary Examiner—Christopher Mahoney
(74) Attorney, Agent, or Firm—LaMorte & Associates

(57) ABSTRACT

A kaleidoscope assembly that includes a tubular structure having an open top end, an open bottom end, an interior surface and an exterior surface. The tubular structure is made from a plurality of flat side panels joined along common edges, wherein each of said side panels has a reflective surface that face inwardly to form the interior surface of the tubular structure. A light source is provided for internally illuminating said tubular structure. The light source is activated by a manually operated control that is disposed on the exterior surface of the tubular structure. By providing a light source, the kaleidoscope illuminates whatever object it is placed against.

11 Claims, 4 Drawing Sheets

ILLUMINATED MIRRORED KALEIDOSCOPE AND ITS METHOD OF USE

BACKGROUND OF THE INVENTION

1. Field of the Invention

The present invention relates to kaleidoscope assemblies and similar optical instruments having mirrored internal walls. More particularly, the present invention relates to kaleidoscope instruments that contain electrical sources of illumination.

2. Prior Art Statement

Kaleidoscopes are generally defined as optical instruments consisting of a tube having reflective internal walls. At the bottom of the tube is typically a translucent panel in which are placed loose pieces of colored glass or plastic. When the tube is held up to a light source, light enters the tube through the translucent panel. The light passes through the pieces of glass or plastic, thereby producing a colorful image within the tube.

Certain kaleidoscopes, however, do not have tubes with translucent panels at one end. Rather, certain types of kaleidoscopes, referred to as open-ended kaleidoscopes, are comprised of tubes that are open at both ends. To use the open-ended kaleidoscope, one end of the tube is placed against a colorful or unusual object. The targeted object is then viewed through the opposite end of the open-ended kaleidoscope. The reflective internal walls of the kaleidoscope create a fragmented image that is optically interesting to observe.

Open-ended kaleidoscopes are, in certain ways, advantageous over traditional kaleidoscopes because the images that can be viewed through the open-ended kaleidoscope are limitless. Traditional closed-ended kaleidoscopes present only one type of colorful image that changes little as the colored glass or plastic moves within the translucent panel. Consequently, open-ended kaleidoscopes tend to hold the interest of children longer than do closed-ended kaleidoscopes and therefore have better play value for a child.

One large disadvantage of open-ended kaleidoscopes, however, is that they only work well if light is permitted to enter the open-ended kaleidoscope through one of its two open ends. If one end of an open-ended kaleidoscope is placed flush against a non-illuminescent object and a child seals the opposite end of the kaleidoscope with his/her eye, the interior of the kaleidoscope will be dark. If the interior of the open-ended kaleidoscope is dark, no image can be seen. As such, to use an open-ended kaleidoscope, one end of the kaleidoscope tube is typically placed against an object at an odd angle. This enables light to enter the interior of the kaleidoscope and an image to be viewed. However, it is not always practical or optically interesting to view an object at an odd angle. Such is the limitations of prior art open-ended kaleidoscopes.

A need therefore exists for an open-ended kaleidoscope that has its own internal source of illumination. In this manner, any object can be viewed at any angle and in any lighting conditions.

This need is met by the present invention as described and claimed below.

SUMMARY OF THE INVENTION

The present invention is a novel kaleidoscope assembly. The kaleidoscope assembly is comprised of a tubular structure having an open top end, an open bottom end, an interior surface and an exterior surface. The tubular structure is made from a plurality of flat side panels joined along common edges, wherein each of said side panels has a reflective surface that face inwardly to form the interior surface of the tubular structure. A light source is provided for internally illuminating said tubular structure. The light source is activated by a manually operated control that is disposed on the exterior surface of the tubular structure. By providing a light source, the kaleidoscope illuminates whatever object it is placed against. Accordingly, the kaleidoscope can be used in the dark or in low light conditions where traditional open-ended kaleidoscopes would be non-functional.

BRIEF DESCRIPTION OF THE DRAWINGS

For a better understanding of the present invention, reference is made to the following descriptions of exemplary embodiments thereof, considered in conjunction with the accompanying drawings, in which.

DETAILED DESCRIPTION OF THE DRAWINGS

Figure 1:
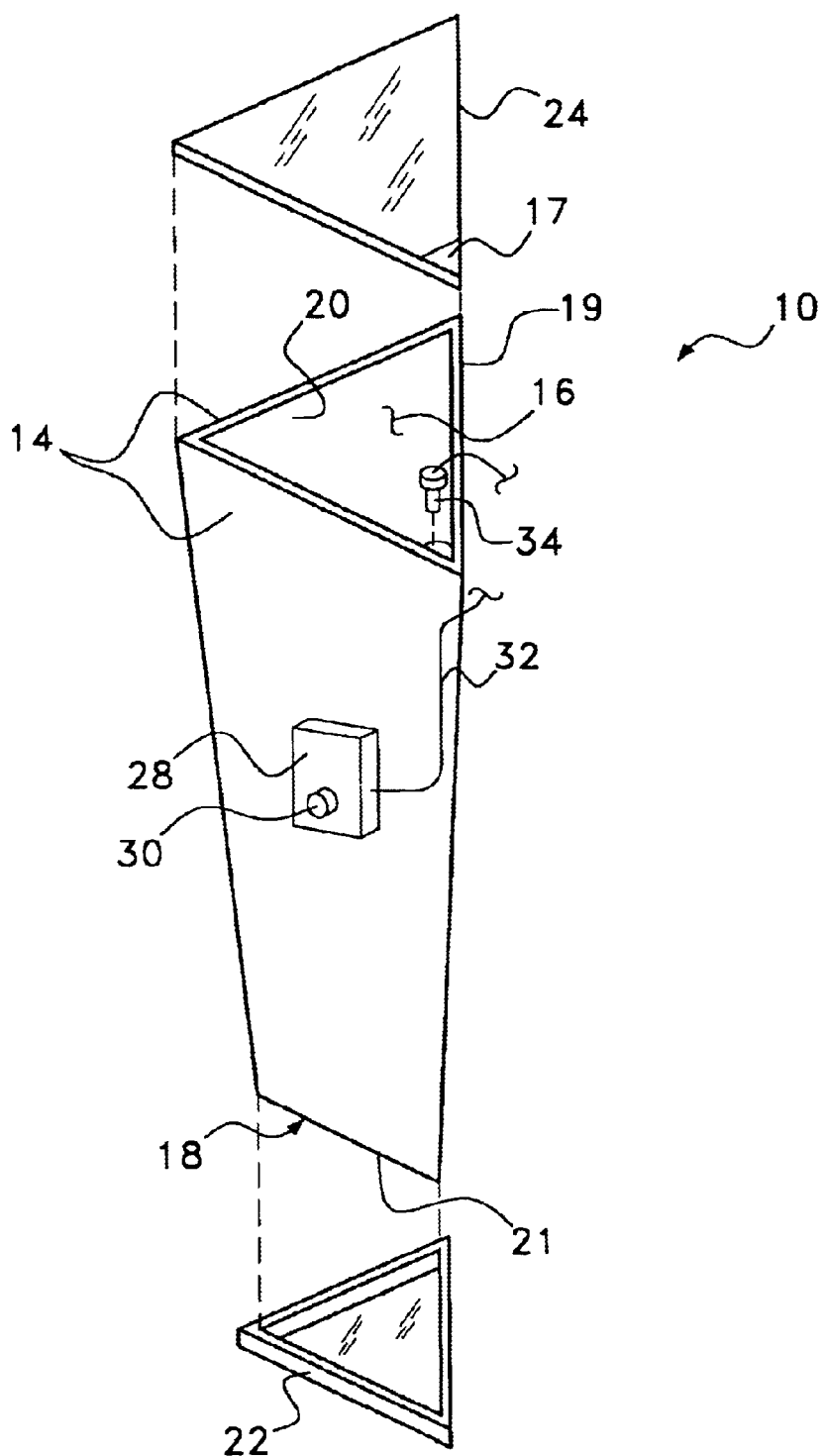
FIG. 1 is a partially exploded perspective view of an exemplary embodiment of a kaleidoscope assembly in accordance with the present invention.

Referring to FIG. 1, there is shown an exemplary embodiment of an illuminated open-ended kaleidoscope assembly 10 in accordance with the present invention. The illuminated kaleidoscope assembly 10 is comprised of a tubular structure 12 that has the general shape of a truncated frustum. The side panels 14 of the tubular structure 12 are planar, wherein each side panel 14 has the shape of a parallelogram. Each side panel 14 of the tubular structure 12 joins another side panels along the corners of the tubular structure 12. This produces the illustrated tubular structure 12 having flat side panels 14 that extend from a wide open top end 16 to a narrow open bottom end 18.

In the shown embodiment, the tubular structure 12 is comprised of three planar side panels 14. As a consequence, the tubular structure 12 has a triangular cross-section in the horizontal plane. The three side panels 14 also produce a large triangular opening at the top end 16 of the tubular structure 12 and a smaller triangular opening at the bottom end 18 of the tubular structure 12. Such a shape is merely exemplary and it should be understood that other geometric shapes can be produced if a different number of side panels 14 are used. For example, if four side panels are used, the tubular structure that would be produced would have a square or diamond shaped cross-section in the horizontal plane. If five side panels are used, the tubular structure would have a pentagonal shaped cross-section profile in the horizontal plane.

Regardless of the number of the side panels 14, the top edge 19 of each side panel 14 is longer than the bottom edge 21 of each side panel 14. Consequently, when the side panels 14 are arranged into the tubular structure 12, the top end 16 of the tubular structure 12 is wider than the bottom end 18 of the tubular structure 12.

Each of the side panels 14 has a reflective interior surface 20. The side panels 14 can be made of glass, plastic or paperboard having a mirrored laminate on its interior surface. The small open end 18 at the bottom of the tubular structure 12 can optionally be covered with a transparent cover 22. Similarly the large open end 16 at the top of the tubular structure can also be optionally covered with a transparent cover 24. The covers 22, 24 prevent the reflective interior surfaces 20 of the tube structure 12 from being dirtied. The covers 22, 24 also add structural strength to the overall assembly that will help the kaleidoscope assembly 10 resist damage if inadvertently dropped or stepped upon. As will be later explained, at least one of the end covers 22, 24 may be removable so that Fly visually interesting foreign objects can be placed within the kaleidoscope assembly 10 for viewing.

The kaleidoscope assembly 10 is electrically illuminated. On the exterior of one of the side panels 14 is disposed a battery housing 28 and an on/off switch 30. Wires 32 connect the on/off switch 30 to an electric light source 34 disposed within the interior of the tubular structure 12.

Figure 2:
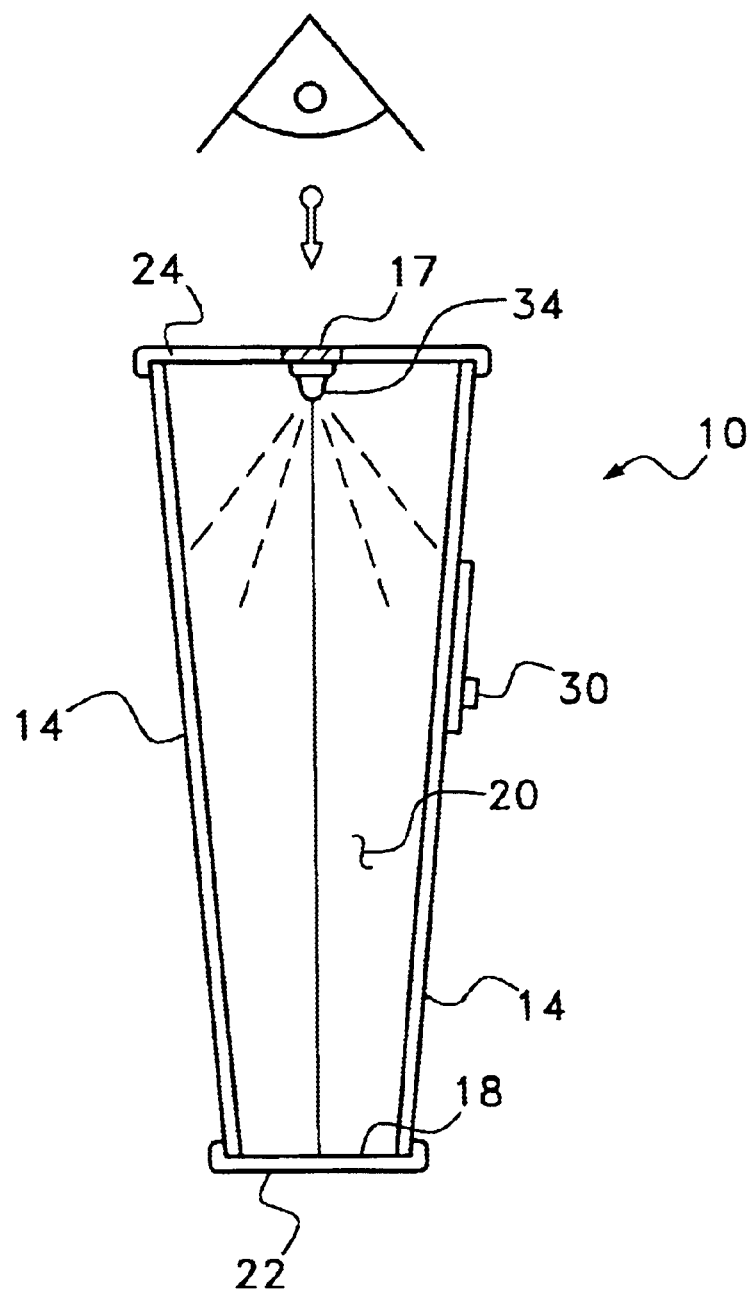
FIG. 2 is a cross-sectional view of the embodiment of the kaleidoscope assembly shown in FIG. 1.

Referring to FIG. 2, it can be seen that the electric light source 34 is located within the interior of the tubular structure 12. The electric light source 34 can be an incandescent bulb. However, the electric light source 34 is preferably a light emitting diode (LED). The LED can emit white light or any colored light desired.

The electric light source 34 is preferably positioned in one corner of the wide top end 16 of the tubular structure 12, immediately adjacent the top transparent cover 24. The top transparent cover 24 is preferably made opaque in a small area 17 directly adjacent the electric light source 34. In this manner, light emitted from the electric light source 34 is directed into the tubular structure 12 and is not directly observable by a person looking through the top transparent cover 24. When the on/off switch 30 is pressed. A circuit is completed thereby activating the electric light source 34. Light from the electric light source 34 bounces off the reflective interior surfaces 20 of the side panels 14, thereby illuminating the interior of the kaleidoscope assembly 10. Enough light passes through the tubular structure 12 that the light illuminates any surface against which the narrow bottom end 18 of the kaleidoscope assembly 10 is placed. Accordingly, any surface can be viewed through the kaleidoscope assembly 10, regardless of ambient lighting conditions.

When a person uses the kaleidoscope assembly 10, a person looks through the wide top end 24 of the kaleidoscope assembly. Due to the large area of the wide top end 16 of the kaleidoscope assembly 10 and the salient points created by the polygonal shape of the wide top end 16, it is nearly impossible for a person to completely obscure the wide top end 16 of the kaleidoscope assembly 10 while looking into the wide top end 16. Consequently, even if the electric light source 34 is not illuminated, ambient light will find its way into the interior of the kaleidoscope assembly 10. Under normal daylight and interior light conditions, enough light enters the kaleidoscope assembly 10 through the wide top end 16 to illuminate any surface against which the narrow bottom end 18 of the kaleidoscope assembly 10 is placed.

Figure 3:
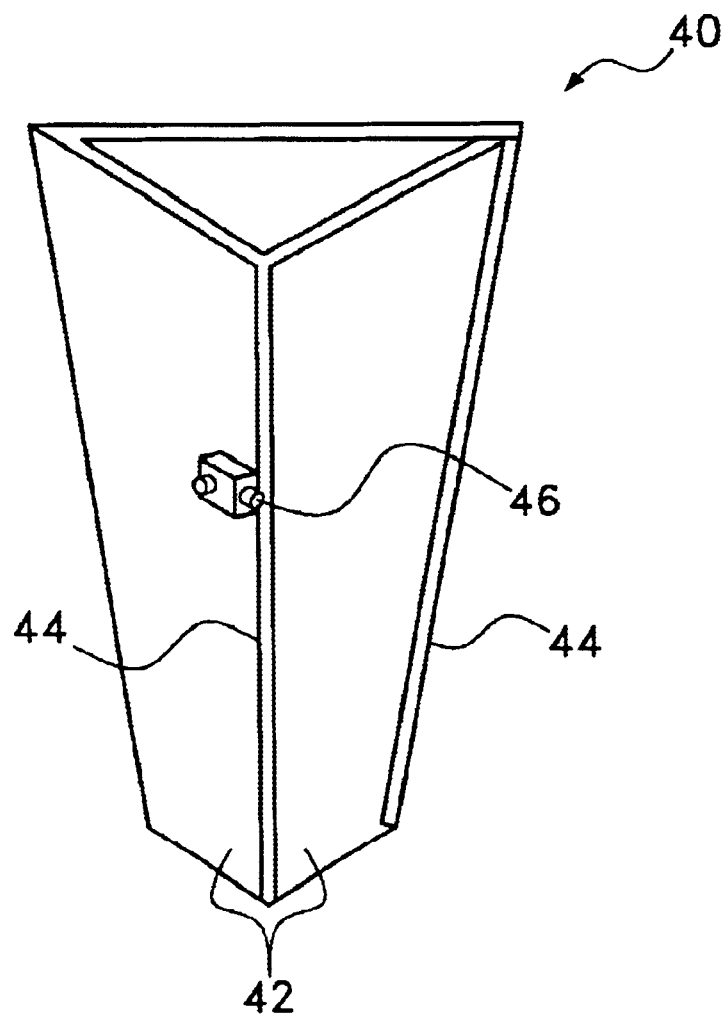
FIG. 3 is a perspective view of an alternate embodiment of a kaleidoscope assembly.

Referring to FIG. 3, an alternate embodiment of the present invention kaleidoscope assembly 40 is shown. In this embodiment, the side panels 42 of the kaleidoscope assembly 40 are made from pieces of transparent material that are silvered or otherwise coated with a reflective material on their back surfaces. The transparent material can be either glass or plastic. When the side panels 42 are attached together to form the tubular structure 40, one side edge 44 of each panel 42 is left exposed on the exterior of the kaleidoscope assembly 40. Ambient light passes into the exposed edge 44 of each panel 42. Once the light passes into the side edge 44 of each panel 42, the light passes into the interior of the kaleidoscope assembly 40 where the light illuminates the interior region. When a child holds the kaleidoscope assembly 40, the fingers of the child will obscure only a small percentage of the exposed edges 44 of the side panels 40. Accordingly, if ambient light is sufficient, enough ambient light will pass into the interior of the kaleidoscope assembly to enable a person to view any surface.

If ambient light is not sufficient, an electric light source 46 can be positioned on the exterior of the kaleidoscope assembly 40 along any of the exposed edges 44. Light emitted from the electric light source 46 will pass into the edge of at least one of the side panels 44, thereby illuminating the interior of the kaleidoscope assembly 40.

Figure 4:
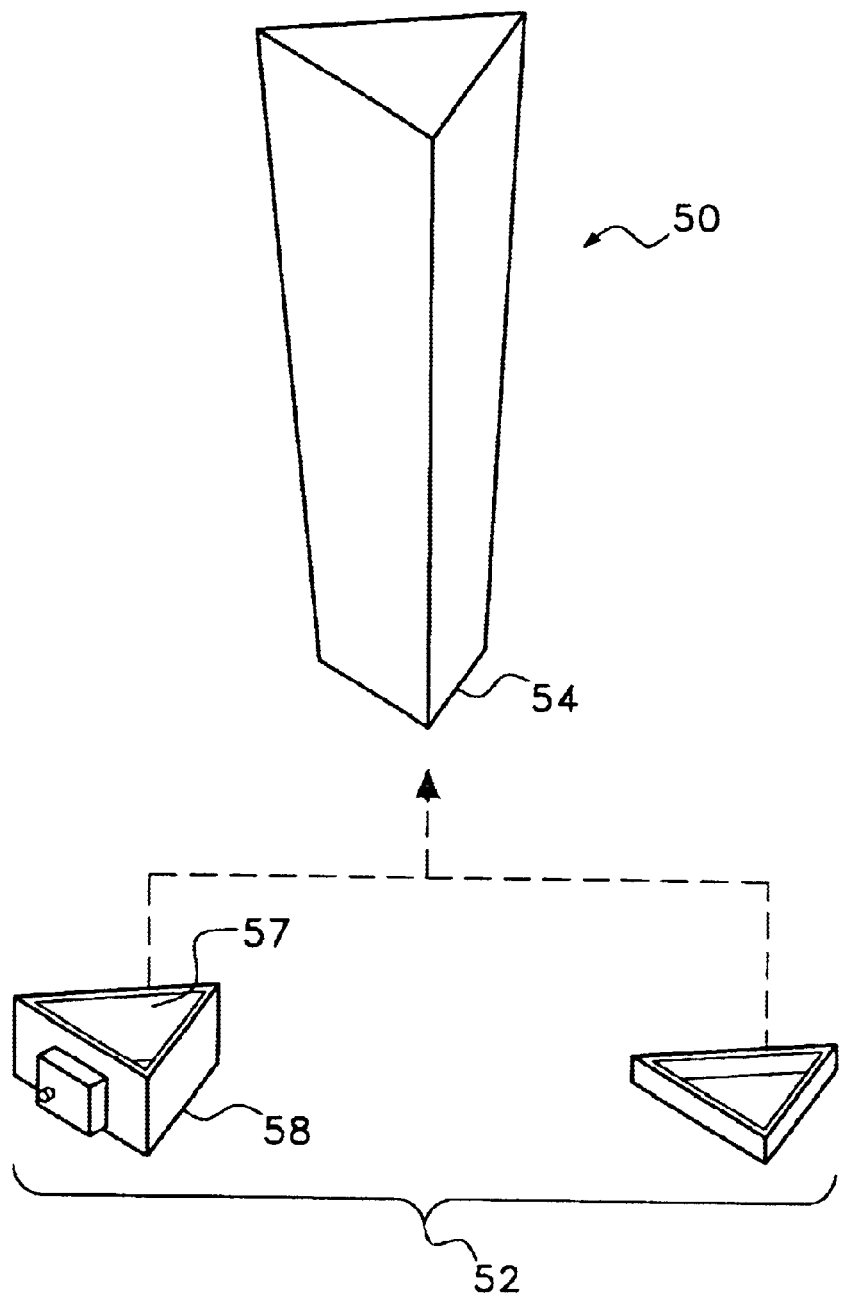
FIG. 4 is a perspective view of another alternate embodiment of a kaleidoscope assembly.

Referring to FIG. 4, yet another embodiment of the present invention kaleidoscope assembly 50 is shown. In this embodiment, one of a plurality of different end terminations 52 can be placed over the narrow bottom end 54 of the kaleidoscope assembly 50. One of the end terminations is a display case 56 in which any appropriately sized object can be placed. The display case 56 has a transparent top surface 57 and a mirrored bottom surface 58. An electric light assembly 60 is present within the display case 56 that illuminates the contents of the display case 56. Since the bottom surface 58 of the display case 56 is reflective, all light from the display case reflects up into the interior of the kaleidoscope assembly, thereby providing a well illuminated view.

It will be understood that all of the embodiments of the present invention illustrated and described are merely exemplary and that the present invention can be practiced in a variety of different ways other than what is shown. For example, the number of side panels used to create the tubular structure of the kaleidoscope can be selectively altered, thereby altering the geometric shape of the kaleidoscope. Furthermore, the specific positions of the shown electric light sources can also be varied to positions not illustrated. All such modifications and alternate embodiments are intended to be covered by scope of the claims presented below.

What is claimed is:

1. A kaleidoscope assembly, comprising:
    a tubular structure having an open top end, an open bottom end, an interior surface and an exterior surface, said tubular structure being made from a plurality of flat side panels joined along common edges, wherein each of said side panels has a reflective surface that face inwardly to form said interior surface;
    a cover for covering said top end of said tubular structure, said cover being transparent except for an opaque area;
    a light source disposed within said tubular structure proximate said cover for internally illuminating said tubular structure, wherein said opaque area of said cover prevents said light source from shining light directly out of said tubular structure through said cover; and
    a manually operated control disposed on said exterior surface of said tubular structure for selectively activating said light source.

2. The assembly according to claim 1, wherein said open top end of said tubular structure has a polygonal shape with salient points where said side panels intersect.

3. The assembly according to claim 2, wherein said light source is disposed in said tubular structure proximate said open top end and near one of said salient points.

4. The assembly according to claim 1, wherein each of said side panels has a first edge that defines part of said open top end of said tubular structure and a second edge that defines part of said open bottom end of said tubular structure, wherein said first edge is longer than said second edge.

5. The assembly according to claim 1, wherein each of said side panels has an exposed side edge disposed between said open top end and said open bottom end.

6. The assembly according to claim 1, further including a display case selectively attachable to said open bottom end of said tubular structure.

7. A kaleidoscope assembly comprising:

a tubular structure having a reflective interior made from flat side panels that are disposed between an open top end and an open bottom end, wherein each flat side panel has a wide top edge that defines part of said open top end and a narrower bottom edge that defines part of said open bottom end, and wherein at least one of said side panels has an exposed side edge that is disposed between said open top end and said open bottom end;

an electrical illumination source that shines light into said exposed side edge, thereby internally illuminating said tubular structure.

8. The assembly according to claim 7, further including a transparent cover that extends over said open top end of said tubular structure.

9. The assembly according to claim 7, wherein said electrical illumination source is disposed on an exterior surface of said tubular structure and shines light into at least a portion of said exposed side edge.

10. The assembly according to claim 7, further including a display case selectively attachable to said open bottom end of said tubular structure.

11. The assembly according to claim 7, wherein said illumination source includes an LED, a battery and an on/off switch for selectively activating said LED.

* * * * *